Patented Nov. 4, 1952

2,616,861

UNITED STATES PATENT OFFICE 2,616,861

PIGMENT COLORING COMPOSITIONS CONTAINING A REACTION PRODUCT OF MELAMINE, FORMALDEHYDE, GLYCERINE, AND AN ALKYLOLAMINE

George F. Jones, Glens Falls, N. Y., assignor to Imperial Paper and Color Corporation, Glens Falls, N. Y., a corporation of New York No Drawing. Application March 9, 1950, Serial No. 148,749

11 Claims. (Cl. 260—17.3)

This invention relates to pigment coloring and has for its object the production of a pigment coating composition in an aqueous medium for the production of pigmented coatings on textiles, paper, leather, roofing granules and the like.

Currently used pigmented printing pastes of the oil in water emulsion type are not entirely satisfactory because of the tendency of the emulsion to break on the printing rolls with attendant transfer of pigment from one phase to the other. Water in oil type emulsions possess the inherent disadvantage of being difficult to clean from the equipment and of presenting some fire hazard since volatile, inflammable solvents are usually present in such systems. For these and other reasons, a completely aqueous system free from emulsions is very desirable in pigment printing and coloring of textiles as such a system completely eliminates the objectionable features inherent in emulsion type coloring compositions.

In accordance with this invention stable aqueous pigmented plates free from emulsions and organic solvents may be prepared which yield prints possessing good washability, light resistance and smudge and crock resistance. These aqueous pigmented pastes are prepared by the incorporation of a dispersed pigment in an aqueous cationic resin solution in the presence of certain protective colloids, anionic in character.

An aqueous, cationic resin which is particularly useful in my process because of its exceptionally strong positive charge and because of its stability over long periods of time is described in my copending application Serial Number 148,748, filed March 9, 1950, now Patent 2,577,767 issued December 11, 1951.

This resin is the product resulting from the reaction of melamine, triethanolamine, glycerine, and formaldehyde, temporarily made acid at a pH of from 0.5 to 2.0 and subsequently neutralized to a pH of from 6 to 7. The process requires that for each mol of melamine at least 7½ mols of formaldehyde, from one to four mols of glycerine, and from one to three mols of an alkylol amine, such as triethanolamine or diethanolamine, be present. The melamine, formaldehyde, glycerine, and alkylol amine are heated together with agitation until a homogeneous clear solution is obtained. The solution is then acidified with hydrochloric acid or other mineral acid to a pH of from 0.5 to 2.0, and then neutralized back with caustic or other suitable chemical to a pH of from 6 to 7 before the resin has a chance to polymerize to a stage where it precipitates or sets up as a solid gel.

The positive charge is given to the resin by the acid treatment. Stability of the resin is assured and premature setting prevented by the presence of the excess of formaldehyde, the glycerine, and by maintaining pH conditions such that polymerization is not encouraged.

A suitable resin for use in my pigmented composition may be made as follows:

840 grams of melamine, 2333 grams of triethanolamine and 1836 grams of glycerine are mixed and heated to 80° C. To the hot mixture are added 3074 grams of 37.1% formaldehyde and 1200 grams of 95% paraformaldehyde. The temperature is maintained at 80° C and the mixture stirred for 15 minutes. At the end of this time 32% hydrochloric acid is slowly added during the following 30 minutes, the addition being carried out while stirring the mixture and maintaining the temperature at from 72° to 82° C. until a pH of $1.5 \pm .2$ is reached. The resulting resin solution is stirred for 1 minute, and then neutralized by the addition of 20% sodium hydroxide while stirring and maintaining the temperature at 70° C. When the pH reaches 6.3, the resin is complete.

The cationic nature of my resin may be demonstrated by either of two methods:

By one method an 800 cc. beaker is fitted with a set of electrodes connected to a regular 6-volt storage battery. The anode is preferably platinum (although steel can be used) in the form of a rectangle 2" x 5". The cathode is a rectangular piece of 40-mesh steel screen having the same dimensions as the anode. The electrodes are placed one inch apart and 700 cc. of aqueous 5% resin solution are placed in the beaker. The circuit is closed and a potential of 6 volts is put across the electrodes. If the resin is cationic, it will be observed to coalesce on the cathode as a white insoluble deposit. Non-cationic resins show either no coalescence on either electrode or coalesce on the anode. Resins meeting the above test can be considered positively charged or cationic resins. My resin coalesces on the cathode quide readily.

A second test which may be readily applied consists of adding bentonite to a solution of the resin. By this method a 2% bentonite dispersion in water is diluted to about 20 to 1 with more water and is added to a 1% solution of the resin. If the resin is cationic it will flocculate or precipitate as curds.

The attainment of acceptable crock resistance of printed materials wherein pigments dispersed in binders are applied as colorants primarily depends upon obtaining a high degree of cohesion between the binder and pigment particles. Certain pigment-binder systems are notorious in producing prints having extremely poor crock resistance. For example, prints produced from certain carbon blacks, having a strong negative charge, and anionic resins have very poor crock resistance; it is commonly held such carbon blacks are difficult to size. I believe that the poor crock resistance of carbon black in the usual anionic or neutral resin is due to the fact that the pigment and binder carry like electrostatic charges; no coulombic forces operate to hold the pigment and binder together. Prints made from negatively charged pigments in cationic resin binders have excellent crock resistance after curing, but tend to be of unacceptably low printing strength. By printing strength I mean the intensity of coloration produced from the application of a given weight of pigment per unit area of surface to be colored; printing strength may be considered a measure of efficiency in the use of the pigment. Inks of low printing strength utilize the pigment inefficiently, while inks of high printing strength more effectively approach full efficiency in the use of the pigment. I have found that if a cationic resin be added to a mixture of pigmented anionic material, the pigmented anionic material is first coagulated and, upon further addition of cationic resin, is then redispersed. This circumstance forms a basis of this invention since I have discovered that this mixture of pigment, anionic material and cationic resin yields a composition which has high printing strength and in which, after curing, the pigment particles are firmly bound to the resin and to each other with exceptionally great cohesion. A further and most useful means of characterizing the anionic component may be given: it is a material, colloidal in nature, which is first precipitated and then redispersed on addition of cationic resin in sufficient quantity. To the best of my knowledge, only materials having such characteristics improve the printing strength of compositions made from cationic resins containing dispersed pigments. The property of the complementary material of increasing printing strength is particularly useful as a test in those cases in which the anionic material is of high molecular weight or is quite viscous since under this condition migration of the anionic material to the anode of an electrolytic cell is slow and difficult to observe.

A typical coloring composition is made of:

(1) Walter dispersible pigment
(2) Anionic film-forming material
(3) Cationic resin
(4) Thickener (optional)

The pigment dispersion may be prepared by any of the methods well known in the art. It is desirable that the pigment be in a fine state of subdivision when incorporated into the formulation so that maximum color value will be obtained therefrom.

The anionic materials I have found particularly useful in carrying out my invention are partially cooked starch pastes, containing a mixture of dissolved and undissolved starch.

The ratio of anionic material to cationic resin may be varied to some extent. There is a minimum limit, however, on the cationic resin below which complete coagulation of the anionic material is obtained with resultant bodying and loss of flow. Additional cationic resin above this minimum redisperses the anionic material so that good flow is obtained. With the anionic materials above mentioned, this minimum of cationic resin has been found to be about 30% the dry weight of the anionic material. For preparing concentrated pastes useful in decorating textiles, I use 9% dispersed pigment, 25.7% starch paste (70% solids) and 22% cationic resin (100% solids) based on the total weight of the paste.

I have found that the introduction of the anionic resinous material into my concentrated pigmented paste has a surprising effect on the printing strength of the paste. Printing pastes of acceptably high printing strengths are obtained by the use of 25% to 30% of anionic material based on the paste weight. Below 25%, the printing strength of the paste falls off rapidly, while the other characteristics of the paste, due primarily to the cationic resin remain substantially unchanged. As the amount of anionic material is increased from 15% to 25%, progressively brighter and stronger prints are obtained from the pastes. Little additional improvement is obtained above 25%; the use of amounts greater than this are not justified.

The following gives the composition of one of my resinated pigment concentrates:

*Example*

| | Percent |
|---|---|
| Dispersed pigment, Phthalocyanine Blue (20% pigment) | 45.0 |
| Starch paste (70–75% Solids) | 25.7 |
| Cationic resin (100% Solids) | 22.0 |
| Water to 100%. | |

For purpose of illustration, to make up a paste of the above composition I place the pigment dispersion in a suitable container and add the requisite amount of anionic material, for example, starch paste. After thorough agitation I add, while continuing the agitation, the cationic resin solution. As the cationic resin solution is added, the mixture gradually becomes thicker and then, as sufficient cationic resin solution is added, the viscosity of the mixture decreases. If necessary, water is added to adjust the desired pigment concentration.

For certain purposes, the above disclosed composition does not have sufficiently high viscosity of its end-use applications. For such uses, the viscosity of the paste may be increased by adding a thickener to the paste mixture. For example, the concentrated paste may contain from 1% to 3% (dry weight) methyl cellulose, or from 0.25 to 2.0% locust bean gum, or from 1% to 5% high viscosity starch modified by treatment with potassium pyroantimonate, which is sold by Stein-Hall of New York, New York, under the trade name of Shopal 15, or any other conventional thickener, such as sodium alginate, sodium carboxymethylcellulose or hydroxy ethyl cellulose.

The following formula, also for the purpose of illustration, is a typical formula for an unpigmented paste or "clear" which is used to reduce the pigmented paste to pigment concentrations below that of the concentrated paste.

*Clear I*

| | Per cent |
|---|---|
| Modified starch of medium viscosity | 7.0 |
| Cationic melamine formaldehyde resin (solid) | 1.0 |
| Water | 92.0 |

Clear II

A further useful, economical clear is obtained from:

| | Per cent |
|---|---|
| Mixture of 3.5 parts high viscosity starch, locust bean gum 1.25 parts, bentonite 1.5 parts | 3.0 |
| Cationic melamine formaldehyde resin (dry basis) | 1.0 |
| Water | 96.0 |

The foregoing medium and high viscosity starches of Clears I and II are starches modified with potassium pyroantimonate according to U. S. Patent 2,343,898.

A mixture of one part of the concentrate shown by the example and 8 parts of Clear II was thoroughly mixed, printed by means of a laboratory print machine on 80 x 80 cotton cloth and dried at 250–275° F. for ten minutes. The resulting printed matter was tested against prints prepared from several of the usual printing paste formulae. The printing formulation disclosed produced an excellent print, having better crock resistance and washability than did the print made from the conventional paste.

This pigment coloring composition is ideally suited to cellulosic materials and particularly to surfaces bearing a negative charge, such as to cotton cloth, rayon, paper and wood, as well as cellulose derivatives, such as cellulose acetate. Other materials such as glass, leather; other textile fabrics, such as woolen cloth and nylon, may also be printed with this pigment coloring composition advantageously. Colored roofing granules may also be advantageously colored with the pigment composition disclosed.

I claim:

1. A pigment paste which comprises a dispersed pigment, a cationic resin and water, said resin being the product prepared by reacting together in the presence of heat and agitation melamine, formaldehyde, glycerine, and an alkylol amine in the proportion of 1 mol of melamine, at least 7½ mols of formaldehyde, 1 to 4 mols of glycerine, and from 1 to 3 mols of an alkylol amine until a homogeneous clear solution is obtained, acidifying the resultant product to a pH of from 0.5 to 2.0, and then neutralizing the product to a pH of from 6 to 7.

2. An aqueous pigmented coating composition which comprises a dispersed pigment, a cationic resin and a thickener, said resin being the product prepared by reacting together in the presence of heat and agitation melamine, formaldehyde, glycerine, and an alkylol amine in the proportion of 1 mol of melamine, at least 7½ mols of formaldehyde, 1 to 5 mols of glycerine, and from 1 to 3 mols of an alkylol amine until a homogeneous clear solution is obtained, acidifying the resultant product to a pH of from 0.5 to 2.0, and then neutralizing the product to a pH of from 6 to 7.

3. An aqueous pigmented coating composition which comprises a dispersed pigment, a cationic resin, and an anionic film-forming material, the ratio of the cationic material to anionic film-forming material being 22% to 18%, the cationic material being the resin of claim 2.

4. An aqueous pigmented coating composition which comprises a dispersed pigment, a cationic resin, an anionic film-forming material and a thickener, the ratio of cationic resin to anionic film-forming material being 22% to 18%, the cationic resin being the resin of claim 2.

5. The pigmented coating composition of claim 4, in which the anionic material is a partially cooked starch paste containing dissolved and undissolved starch.

6. The pigmented coating composition of claim 5, in which the thickener is an antimony modified starch.

7. The pigmented coating composition of claim 5, in which the thickener is a mixture of locust bean gum, bentonite and an antimony modified starch.

8. The pigmented coating composition of claim 4, wherein the alkylol amine is predominately triethanolamine.

9. The pigmented coating composition of claim 4, in which the alkylol amine is predominately diethanolamine.

10. The pigmented coating composition of claim 6, in which the alkylol amine is predominately triethanolamine.

11. The pigmented coating composition of claim 7, in which the alkylol amine is predominately triethanolamine.

GEORGE F. JONES.

No references cited.